May 5, 1953
R. DAVISON ET AL
2,637,168
APPARATUS FOR TRANSMITTING OSCILLATORY MOTION
OF A KNOWN FREQUENCY AND SUPPRESSING
SUPERIMPOSED OSCILLATORY MOTIONS
OF OTHER FREQUENCIES
Filed Sept. 1, 1951
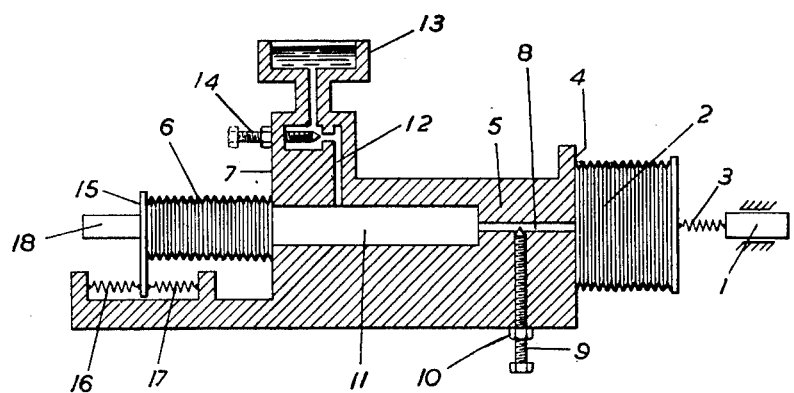
Richard Davison
Richard Barradell-Smith
Inventors
Morrison, Kennedy & Campbell
By
Attorneys Patented May 5, 1953

2,637,168

UNITED STATES PATENT OFFICE 2,637,168

APPARATUS FOR TRANSMITTING OSCILLATORY MOTION OF A KNOWN FREQUENCY AND SUPPRESSING SUPERIMPOSED OSCILLATORY MOTIONS OF OTHER FREQUENCIES

Richard Davison and Richard Barradell-Smith, St. Helens, England, assignors to Pilkington Brothers Limited, Liverpool, Lancaster County, England, a corporation of Great Britain Application September 1, 1951, Serial No. 244,834
In Great Britain August 11, 1951

5 Claims. (Cl. 60—54.5)

This invention relates to apparatus for transmitting oscillatory motion of a known frequency and suppressing superimposed oscillatory motions of other frequencies.

The main object of the present invention is to provide apparatus capable of transmitting slow motions which are difficult to transmit and filter by electrical means.

A further object of the invention is to provide for the amplification of the oscillatory motion which is transmitted.

One particularly advantageous use of apparatus according to the invention is for transmitting the eccentric motion of a slowly rotating distorted or bowed roll while filtering out or suppressing slow changes due to alterations in position of bearings for the roll and suppressing high-frequency vibrations due to roughness of the roll surface and vibration in the roll drive. Such conditions sometimes occur with internally water-cooled casting rolls rotating at a speed of one to ten revolutions per minute as used in continuous plate glass processes. It will, however, be understood that the apparatus according to the present invention may be employed for other purposes, for example it may be used to transmit the deflections of a railway bridge under traffic, suppressing the slow change of position caused by diurnal temperature changes and also the rapid vibrations due to the traffic wheels passing over the rail joints and the hammer-blows of the vertical out-of-balance forces of locomotives.

In the specification of our co-pending application Serial No. 244,833, is described apparatus for transmitting oscillatory motion of a known frequency and suppressing superimposed oscillatory motions of higher and lower frequencies which it is desired not to transmit. In said apparatus the suppression of the unwanted higher-frequency oscillations is dependent on the amplitude of such oscillations being of a constant magnitude, so that such high-frequency oscillations can be absorbed by a lost-motion device which is adjusted to a corresponding value.

The apparatus according to the present invention responds solely to frequency, and the functioning of the apparatus is independent of the amplitudes of the unwanted oscillations and of the amplitudes of the oscillations which it is desired to transmit.

According to the present invention, an apparatus for transmitting oscillatory motion of a known frequency and suppressing superimposed oscillatory motions of higher and lower frequencies which it is desired not to transmit, comprises a pair of liquid-filled flexible bellows or equivalent devices communicating with each other through an adjustable bleed device, one of said bellows or the like being connected to an input member through a resilient coupling and the other being operatively connected to an output member and having an adjustable vent or bleed to a reservoir at atmospheric pressure and having its outer end urged to a neutral position by balance springs.

In order that the invention may be clearly understood one embodiment thereof will now be described, by way of example, with reference to the accompanying diagrammatic drawing.

Referring to the drawing, a power take-off member 1 which is to be subjected to a composite oscillatory motion consisting of a known intermediate frequency which it is desired to transmit, and unwanted higher and lower frequencies, is connected to the outer end of a first resilient circular bellows 2 through a stiff spring 3. The inner end of the bellows is connected to one side 4 of a mounting 5 having the inner end of a second resilient circular bellows 6 secured to the opposite side 7 thereof. A bore or conduit 11, which may conveniently be coaxial with the bellows, 2, 6, extends through thhe mounting and has a portion 8 of reduced cross-section. The conduit 11, 8 forms a fluid link between the two bellows. The rate of liquid flow between the bellows is rendered adjustable in any convenient manner, for example by means of a screw needle-valve 9. The needle-valve 9 may be provided with a lock nut 10 for locking it in the desired position of adjustment with respect to the conduit portion 8.

A second conduit 12 forms a fluid link and acts as a bleed passage between the conduit 11 and a liquid reservoir 13 the liquid in which is at atmospheric pressure. A bleed adjuster 14, which may conveniently be a needle-valve as above described, projects into the second conduit 12. The outer end 15 of the second resilient bellows is urged to a neutral position by the provision of balance springs 16, 17 disposed on opposite sides thereof. A transmission element 18 is secured to the outer end 15 of the second bellows. The two resilient bellows are filled with viscous liquid, such as oil, and like liquid is contained in the conduit 8, 11, the conduit 12, and the reservoir 13. By suitable selection of the ratio of the diameters of the two bellows, any desired amplification of the movement of the power take-off member can be transmitted to the transmission element 18.

The operation of the device is as follows:

The needle-valve 9 is so set, that the stiffness of the spring coupling 3 is so chosen, that the rate of flow of liquid between the first and second bellows is restricted to a value at which all oscillations of the power take-off member 1 at frequencies higher than that which it is desired to transmit are substantially absorbed by the spring coupling 3.

The adjustable bleed 12, 14 is set so as to restrict the rate of flow of liquid to and from the reservoir 13 to a value corresponding to frequencies below that which it is desired to transmit. Oscillatory motion at the desired frequency is thereby transmitted to the transmission element 18 and is amplified in accordance with the ratio of the diameters of the two bellows.

Although one construction according to the invention has been described, it will be understood that modifications may be made thereto. For example pistons operating in cylinders may be employed instead of the resilient bellows and the bleed valves may be provided in pipes instead of in bores in the mounting.

We claim:

1. For transmitting oscillatory motion of a known frequency and suppressing superimposed oscillatory motions of higher and lower frequencies which it is desired not to transmit, apparatus comprising a viscous liquid filled conduit, a first member mounted at one end of the conduit for movement in response to variations of pressure in the liquid, a second member mounted at the other end of the conduit for movement in response to variations of pressure in the liquid, a power take-off member, a stiff resilient coupling connecting the power take-off member to said first member, adjustable flow controlling means to control the rate of liquid flow between said first and second members whereby oscillatory motions of frequencies higher than that to be transmitted are absorbed by said resilient coupling, balance springs coupled to said second member to urge it to a neutral position, a transmission element movable with said second member to transmit the motion of desired frequency, a reservoir containing viscous liquid at atmospheric pressure, and an adjustable bleed device between said conduit and reservoir to control the rate of liquid flow therebetween thereby to absorb oscillatory motions of frequencies below that to be transmitted by the transmission element.

2. For transmitting oscillatory motion of a known frequency and suppressing superimposed oscillatory motions of higher and lower frequencies which it is desired not to transmit, apparatus comprising a first viscous liquid filled resilient bellows, a second viscous liquid filled resilient bellows, a viscous liquid filled conduit forming a fluid link between said first and second bellows, a power take-off member, a stiff resilient coupling connecting the power take-off member to said first bellows, adjustable flow controlling means to control the rate of liquid flow between said first and second bellows whereby oscillatory motions of frequencies higher than that to be transmitted are absorbed by said resilient coupling, balance springs coupled to said second bellows to urge it to a neutral position, a transmission element movable with said second bellows to transmit the motion of desired frequency, a reservoir containing viscous liquid at atmospheric pressure, and an adjustable bleed device between said conduit and reservoir to control the rate of liquid flow therebetween thereby to absorb oscillatory motions of frequencies below that to be transmitted by the transmission element.

3. For transmitting oscillatory motion of a known frequency and suppressing superimposed oscillatory motions of higher and lower frequencies which it is desired not to transmit, apparatus comprising a first viscous liquid filled cylindrical resilient bellows, a second viscous liquid filled cylindrical resilient bellows, a viscous liquid filled conduit forming a fluid link between said first and second bellows, a power take-off member, a stiff resilient coupling connecting the power take-off member to said first bellows which is of greater diameter than that of the second bellows to amplify motion transmitted thereto, adjustable flow controlling means to control the rate of liquid flow between said first and second bellows whereby oscillatory motions of frequencies higher than that to be transmitted are absorbed by said resilient coupling, balance springs coupled to said second bellows to urge it to a neutral position, a transmission element movable with said second bellows to transmit the motion of desired frequency, a reservoir containing viscous liquid at atmospheric pressure, and an adjustable bleed device between said conduit and reservoir to control the rate of liquid flow therebetween thereby to absorb oscillatory motions of frequencies below that to be transmitted by the transmission element.

4. For transmitting oscillatory motion of a known frequency and suppressing superimposed oscillatory motions of higher and lower frequencies which it is desired not to transmit, apparatus comprising a first viscous liquid filled cylindrical resilient bellows, a second viscous liquid filled cylindrical resilient bellows, a viscous liquid filled conduit forming a fluid link between said first and second bellows, a power take-off member, a stiff resilient coupling connecting the power take-off member to said first bellows which is of greater diameter than that of the second bellows to amplify motion transmitted thereto, adjustable flow controlling means comprising a conduit portion of reduced cross-section and a needle valve cooperating therewith to control the rate of liquid flow between said first and second bellows whereby oscillatory motions of frequencies higher than that to be transmitted are absorbed by said resilient coupling, balance springs coupled to said second bellows to urge it to a neutral position, a transmission element movable with said second bellows to transmit the motion of desired frequency, a reservoir containing viscous liquid at atmospheric pressure, and an adjustable bleed device to control the rate of liquid flow between said conduit and reservoir thereby to absorb oscillatory motions of frequencies below that to be transmitted by the transmission element, said bleed device comprising a secondary conduit forming a fluid link between said first mentioned conduit and the reservoir and a needle valve co-operating with said secondary conduit.

5. For transmitting oscillatory motion of a known frequency and suppressing superimposed oscillatory motions of higher and lower frequencies which it is desired not to transmit, apparatus comprising a mounting, a first viscous liquid filled resilient cylindrical bellows secured to one end of the mounting, a second viscous liquid filled resilient cylindrical bellows secured to the opposite end of the mounting, a viscous liquid filled conduit extending through the mounting to communicate with the interior of each of said bellows and form a liquid link therebetween, said conduit having a portion of reduced cross-section to communicate with said first bellows, a power take-off member, a stiff resilient coupling connecting the power take-off to said first bellows which is of greater diameter than that of the second bellows to amplify motion transmitted thereto, an adjustable needle valve co-operating with said conduit portion of reduced cross-section to control the rate of liquid flow between the first and second bellows whereby oscillatory motions of frequencies higher than that to be transmitted are absorbed by said resilient coupling, balance springs coupled to said second bellows to urge it to a neutral position, a transmission element movable with said second bellows to transmit the motion of desired frequency, a reservoir integral with said mounting and containing viscous liquid at atmospheric pressure, a second conduit forming a liquid link between said first mentioned conduit and the reservoir, and an adjustable needle valve co-operating with said second conduit to control the rate of liquid flow between the reservoir and said first mentioned conduit thereby to absorb oscillatory motions of frequencies below that to be transmitted by the transmission element.

RICHARD DAVISON.
RICHARD BARRADELL-SMITH.

References Cited in the file of this patent

UNITED STATES PATENTS

| Number | Name | Date |
|---|---|---|
| 2,274,254 | Newton | Feb. 24, 1942 |

FOREIGN PATENTS

| Number | Country | Date |
|---|---|---|
| 127,676 | Great Britain | June 12, 1919 |
| 612,012 | Germany | Apr. 11, 1935 |